July 22, 1952          J. W. WILLIAMSON          2,604,575
METHOD AND MEANS FOR CONTROLLING ELECTRICAL POWER
DELIVERED TO A VARIABLE IMPEDANCE LOAD
Filed March 30, 1948

INVENTOR.
JAMES W. WILLIAMSON
BY
Alfred C. Body
ATTORNEY

Patented July 22, 1952

2,604,575

UNITED STATES PATENT OFFICE 2,604,575

METHOD AND MEANS FOR CONTROLLING ELECTRICAL POWER DELIVERED TO A VARIABLE IMPEDANCE LOAD

James W. Williamson, Cleveland, Ohio, assignor to The Ohio Crankshaft Company, Cleveland, Ohio Application March 30, 1948, Serial No. 17,865

1 Claim. (Cl. 219—47)

This invention pertains to electrical power equipment such as the type used for heating metals or the like by means of alternating electric currents and, more particularly, to a method and means for controlling within any desired range the ratio of electrical power delivered to the article to be heated at the beginning and end of a heating cycle.

In the art of using electric currents, and particularly alternating currents, for the cyclic heating of articles of manufacture both the electrical resistance and reactance of the load on the power source varies considerably during the heating cycle. This variation appears to be caused by a number of factors inherent in the elements of the electrical load circuit. So far as is understood, however, with magnetic materials it appears to be due principally to inherent variable physical and electrical properties of the article being heated as its temperature changes from room temperature through the magnetic range, past the "Curie" point and into the temperatures required for quench hardening, forging, annealing, melting, welding, or the like. As is known, the article forms a part of the electrical load circuit, being coupled thereto in one manner or another, either inductively, by direct electrical contact or otherwise. The article, of course, forms the load to which it is ultimately desired to deliver power. With a constant voltage power source, when the electrical impedance of the load varies, the power delivered to the load also varies. In some installations it has been found that the power demand first increases and then drops quite rapidly to a final value considerably below even the initial power demand. For the types of alternating current power sources conventionally used, i. e., types having a generally constant voltage output, this variation in load impedance imposes serious problems from a design standpoint. Thus the power source, in order that it will not be unduly overloaded on power demand peaks, must have a rating or size far greater than the average power demand over the entire heating cycle and particularly the power required at the end of the heating cycle. The equipment thus used is inefficient, and the overall cost thereof is increased without any compensating improvement in performance.

As a solution to the problem, it has been proposed to provide a power source having a remotely controlled variable voltage output which is automatically varied to offset the effect of the circuit impedance variations. Also multitap transformers have been proposed with automatic tap selection to vary the voltage applied to the load as the circuit impedance varies. Such proposals are generally expensive to manufacture, cumbersome to build, and difficult to successfully adjust for operation in commercial practice.

In view of the foregoing, it is an object of the present invention to provide a new and improved electrical circuit for alternating current electrical heating apparatus wherein the impedance of the load varies in a known or determinable manner during the heating cycle, which circuit is simple and economical, which employs a minimum number of electrical components which may be fixed in value, which inherently compensates for the variations in the impedance of the load whereby the power delivered to the load is a substantially constant value, and which avoids the drawbacks of the prior art.

Another object of the invention is the provision of a new and improved alternating current electric power circuit having a load, the electrical impedance of which varies over determinable range, the circuit having a fixed reactive component in series with the load so proportioned in electrical value that notwithstanding the impedance variation, the average instantaneous power delivered to the load may be generally constant.

Still another object of the invention is the provision of a new and improved circuit for use in induction heating having a fixed reactance in series with the load the impedance of which inherently varies during the heating cycle, the fixed reactance having an electrical value such as to provide a substantially constant average electrical power delivered to the article to be heated during the heating cycle without the use of other control means.

Another object of the invention is to provide a new and improved method and means of determining the value of a fixed reactor to be placed in an electrical heating circuit whereby the power delivered to the load may be substantially the same or variable through a predetermined range at the beginning and end of the heating cycle.

Another object of the invention is to provide a new and improved circuit for induction heating equipment which permits the use of an electrical power source having a minimum power rating in relation to the average power delivered to the load and which avoids the drawback of the prior art.

Another object of the invention is the provision of new and improved alternating current heating equipment having fixed electrical components so proportioned and electrically connected that the powder delivered to the load at the beginning and end or any other two points of the heating cycle is or may be made to be the same or have any desired ratio.

The invention consists in certain arrangements of parts, electrical circuits, and methods and means of arriving at the proper electrical values for such parts and circuits. a preferred embodiment of which invention will be described herein-after and is illustrated in the accompanying drawing which is made a part hereof, and wherein.

The invention will be described in conjunction with induction heating equipment, although it will be appreciated that it is also usable in other electrical fields where the impedance of the load varies and it is desired to level out the effects of such impedance variations on the power.

Figure 1:
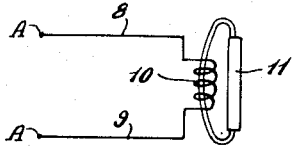
Fig. 1 is a wiring diagram of a typical induction heating circuit having the inductor coupled to an article to be heated.

Referring to the drawings, Fig. 1 shows a typical induction heating circuit with alternating electrical power at any desired frequency being delivered from a suitable power source such as a motor generator, vacuum tube oscillator, or the like (not shown), to the terminals A—A, which power is delivered through electrical conductors 8, 9 to an inductor 10 inductively coupled to an article 11 to be heated of metal or the like. The inductor 10 may take any conventional shape or form so as to produce the required heat pattern in the article to be heated. As is conventional with electrical circuits, the load, as viewed by the power source at terminals A—A, has an impedance consisting of both reactive and resistive components, which may be conveniently plotted in graphical form such as that shown in Fig. 6 or represented in a lumped schematic form as shown in Figs. 3 and 4.

Figure 2:
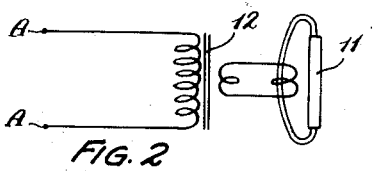
Fig. 2 is a diagram similar to Fig. 1 but showing the use of a transformer interposed between the power source and the inductor.

Fig. 2 shows a transformer 12 interposed between the inductor 10 and the power source terminals A—A, the effect of which is to vary the impedance as viewed by the source of power in accordance generally with the square of the relative number of turns of the transformer 12.

Figure 3:
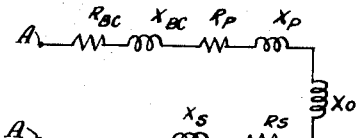
Fig. 3 is an equivalent circuit for the circuit from the points A—A of Fig. 1 to the load or the article to be heated.
Figure 4:
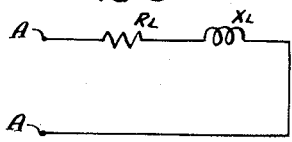
Fig. 4 is a circuit similar to that of Fig. 3 with the electrical elements lumped for the purposes of simplicity.
Figure 5:
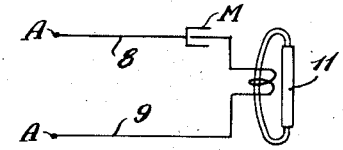
Fig. 5 is an induction heating circuit embodying the present invention.

Fig. 3 shows the equivalent electrical circuit for the circuit shown in Fig. 1 and wherein $R_{BC}$ and $X_{BC}$ represent the resistance and reactance of the transmission line or conductors 8 and 9 between the points A—A and the terminals of the inductor 10; $R_P$ represents the resistance associated with $I^2R$ or copper loss in the inductor, and is approximately equal to the resistance of the inductor with the load removed; $X_P$ is approximately equal to $R_P$ and represents the reactance due to magnetic flux within the conducting material of the inductor; $X_0$ represents the reactance associated with magnetic flux between the coil and load; and $R_S$ and $X_S$ represent the resistance and reactance of the load as reflected in the inductor. If a transformer 12 were to be included, as shown in Fig. 2, the resistance and reactance of the transformer should also be represented, although for the purposes of disclosing the present invention, such terms need not be included and will be omitted for the purposes of simplicity. The resistances and reactances shown in Fig. 3 may be lumped into one, as shown in Fig. 4, $R_L$ representing the resistance of the leads, the inductor, and that of the load as reflected through the inductor while $X_L$ represents the reactance of the leads, the inductor and the load, as reflected through the inductor 10.

The power at any time delivered to the load is generally equal to $$\frac{E^2}{R_L^2 + X_L^2} R_L$$

where E is the voltage between points A—A. During the course of a heating cycle, the metals involved expand or change their shape, vary their resistivity, and in the case of steel loads heated above the critical temperature where the transformation from the magnetic state to the non-magnetic state occurs, the factors $R_L$ and $X_L$ may vary and do vary considerably. Such variations cause the power delivered to and consumed by the load to vary over a rather wide range, these variations being represented by changes in the total current and the phase relationship of this current to the applied voltage.

The present invention contemplates utilizing these changes to effect the desired objects.

In the preferred embodiment shown, a reactor M is connected in series with the conductor or lead 8. The electrical value of this reactor is quite critical and must be carefully chosen for each installation and for each set up if the desired result are to be obtained. Broadly speaking, the reactor M has an electrical value such that for a particular inductor and article, the component of the total current in phase with the voltage will have a value in relation to the resistance of the load that the $I^2R_L$, i. e., the actual power delivered to the load, will be the same for any two predetermined points or instances in the heating cycle. Stated otherwise the ratio of the power at these points will have a 1-1 ratio. It will be appreciated that, upon an understanding of the method to be described, ratios of other than 1-1 can be obtained if desired. The reactor M has a function all of its own and will be in addition to any reactor as now normally provided for adjusting the power factor of the load as viewed by the power source and in addition to any series reactors now provided for the purpose of balancing the internal reactance of the generator.

In most induction heating circuits for articles made of materials having magnetic properties which are being heated from a generally constant voltage power source, the power first increases very rapidly due to an increase in resistance of the load and a somewhat smaller non-compensating increase in reactance. Subsequently and particularly as the article being heated reaches a temperature where its magnetic properties change and disappear, the power drops off radically to a value considerably less than the initial value due to a decrease of the resistance. Non-magnetic materials generally show a continuously increasing power.

The predetermined points referred to in the paragraph above may be selected from any two points in the heating cycle. For most installations, it is preferred to select the impedance at the point of maximum power and the impedance at the point of minimum power, which is normally at the end of the heating cycle. A point before or after the maximum power is reached could also be used.

For the purposes of explaining this invention, the impedances at the beginning and end of the heating cycle only will be referred to. For most accurate control, of course, the value of the reactor M should be chosen on the basis of the impedance at the point of maximum power.

Also for the purposes of explaining this invention, it will be assumed that the factors $R_L$ and $X_L$ vary in a constant linear relationship, with respect to each other, that is, when the loci of the resistances and reactances are plotted on a resistance-reactance graph from the beginning to the end of a heating cycle, the loci may be represented as a straight line. It will be appreciated that in actual practice the loci is not a straight line, but it has been found that the variations do not materially affect the results which this invention contemplates. So long as the power delivered to the load is the same at the beginning and end of the heating cycle, the power delivered during the entire course of the heating cycle will generally remain substantially constant.

Figure 6:
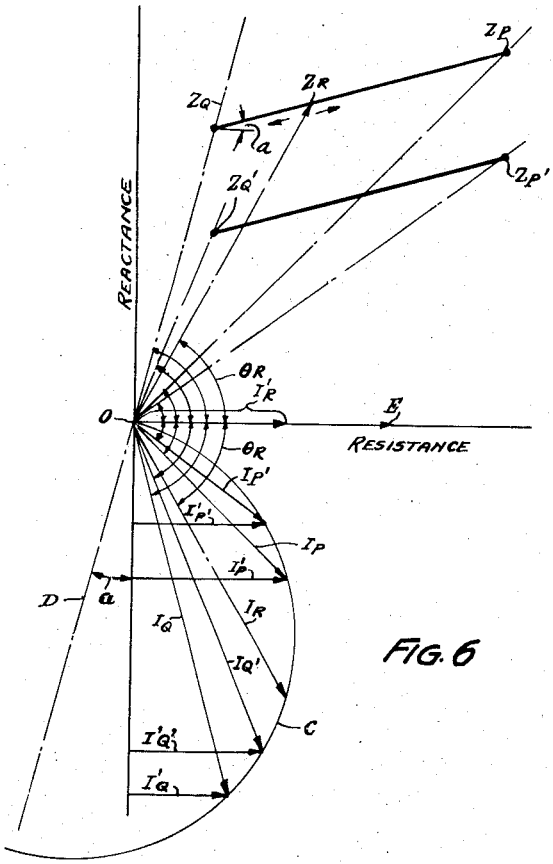
Fig. 6 is a view showing one embodiment of a graphical construction by which the value of the capacitor of Fig. 5 may be determined so that the power delivered to the load at the beginning and end of a heating cycle may have any desired ratio such as unity or thereabouts.

Referring now to the graph shown in Fig. 6, the reactive components of the load are shown plotted on the vertical axis and the resistive components are shown plotted on a horizontal axis, unit distances representing any desired and predetermined values of reactance and resistance. The origin is shown marked O. The point $Z_P$ represents the loci of the resistive and reactive components at the beginning of the heating cycle; the point $Z_Q$ represents the loci of the resistive and reactive components at the end of the heating cycle; and the line $Z_P$—$Z_Q$ represents the loci of the resistive and reactive components at any given time in the course of the heating cycle. As stated previously, this is assumed for the purposes of illustration to be a straight line. In actual practice $Z_P$ would probably correspond to the impedance at the point of maximum power.

The points $Z_P$ and $Z_Q$ may be located on the graph by calculating the values of resistance and reactance of the inductor coil and its load when the article to be heated is at both the initial and the final temperature. Alternatively, the points $Z_P$ and $Z_Q$ may be located by measuring the resistance and value of the inductor coil and its load at the initial and final temperature, the points then being plotted to any convenient scale in the graph. The angle $a$, which the line $Z_P$—$Z_Q$ makes with the horizontal axis represents the rate of change of $R_L$ and $X_L$ during the heating cycle. A diameter D of a circle C, representing the loci of the current through the inductor, should be drawn in from the origin O of the graph and disposed at an angle to the vertical axis the same as the angle $a$, as is conventional. The applied voltage E may be represented by a horizontal vector. The circle C has its center on this diameter and passes through the origin O of the graph and represents the loci of current for any point $Z_R$ along the line $Z_P$—$Z_Q$. The current vector is represented as $I_R$. As is conventional in graphical constructions of this kind, the angle $\theta_R$ of the current vector $I_R$ is the same as the angle $\theta_R$ of the impedance vector O—$Z_R$. The horizontal components $I'_R$ of the current vectors then represent the current in phase with the applied voltage E, which is assumed constant. It will be noted from Figure 6 that the in-phase or horizontal components $I'_P$ and $I'_Q$ corresponding to the points $Z_P$ and $Z_Q$ differ considerably, indicating the very wide range of power which may be delivered to the load at the beginning and end of the heating cycle due to the inherent variation in the load impedance without this invention or with a reactance M of the improper value.

As pointed out heretofore, in order for the power delivered to the load at the beginning and the end of the heating cycle to be the same, it is necessary to have the horizontal or in-phase components of the currents $I'_P$, $I'_Q$ equal at the beginning and end of the heating cycle. It will be shown that a reactance M of the proper electrical value will effect this condition.

The effect of the reactance M in series with the inductor is to shift the line $Z_P$—$Z_Q$ vertically on the graph to some new line $Z_{P'}$—$Z_{Q'}$ which in Figure 6 is shown in the ultimate or desired position where the power delivered to the load is the same at the beginning and end of the heating cycle.

It will be observed that by shifting the line $Z_P$—$Z_Q$, the resultant effect is to shift or rotate the current vectors $I_P$ and $I_Q$ and accordingly vary the in-phase component $I'_P$ and $I'_Q$ of the current $I_P$ and $I_Q$. The number of amperes represented by one inch is of course different for vectors $I'_P$, $I'_Q$ and $I'_R$ than for $I_P$, $I_Q$ and $I_R$. It will also be observed that at one position and one position only of the vectors $I_P$, $I_Q$ (shown as $I_{P'}$, $I_{Q'}$) the in-phase components are equal and at this position the power input to the load at the beginning and end of the heating cycle will be equal. At this point it should be pointed out that the power delivered to the load is distinguished from the volt-amperes delivered to the load which may be quite high due to a poor power factor. The average power factor with the series condenser is improved although it will generally vary more widely during the heating cycle. Other means such as a variable reactor may be connected across the terminals of the power source to correct the power factor as seen by the power source.

Obviously, the line $Z_P$—$Z_Q$ may be shifted by varying the resistance, the reactance, or both. If a resistance is introduced into the load circuit, power losses increase. This is undesirable. Accordingly, the present invention contemplates introducing a reactive component having preferably negligible resistance losses into the load circuit, the effect of which is to shift the $Z_P$—$Z_Q$ vertically to a new position $Z_{P'}$—$Z_{Q'}$.

The amounts which the line $Z_P$—$Z_Q$ should be shifted vertically may be determined by the trial and error method, wherein the line is arbitrarily relocated by a vertical movement (thus rotating the current vectors $I_P$, $I_Q$) maintaining the angle $a$ the same until a point is found wherein the horizontal components $I'_{P'}$, $I'_{Q'}$ of the correspondingly shifted current vectors $I_{P'}$ and $I_{Q'}$ are equal.

The scaled amount of vertical shift of the line $Z_P$—$Z_Q$ from its original position represents the required reactance of the reactor M to be supplied in the inductor circuit to accomplish the desired object of the invention. The reactance of the reactor M may be scaled off. In the line $Z_{P'}$—$Z_{Q'}$ is below the line $Z_P$—$Z_Q$, a capacitance must be used. If the line $Z_{P'}$—$Z_{Q'}$ is above the line $Z_P$—$Z_Q$, inductance must be used. For induction heating circuits it has been found that, as a general rule, a capacitance will be required. The description of the invention has been made on that basis.

A second method of determining the value of the corrective reactance is by using the following formulae:

$$X_M = X_{L1} - \sqrt{\frac{R_{L1}E_G^2}{W} - R_{L1}^2} = X_{L2} - \sqrt{\frac{R_{L2}E_G^2}{W} - R_{L2}^2}$$

where: subscript 1 denotes conditions corresponding to maximum $R_L$, subscript 2 denotes conditions corresponding to minimum $R_L$, and $$W = \frac{E_G^2}{R_{L1} + R_{L2}} \times \frac{\cos a}{\sec a \pm \sqrt{\tan^2 a - \tan^2 b}}$$

where:

$$\tan a = \frac{X_{L1} - X_{L2}}{R_{L1} - R_{L2}}$$

$$\tan b = \frac{X_{L1} - X_{L2}}{R_{L1} + R_{L2}}$$

and $E_G$ is the voltage of the power source.

If $X_{L1}$ is greater than $X_{L2}$, the plus sign applies in the expression for W, and $a$ and $b$ are between 0 and 90°. If $X_{L1}$ were less than $X_{L2}$, $a$ and $b$ would be between 0 and −90° and the minus sign would apply in the expression for W.

In the formulae above, W represents the power for a given generator voltage at which a load (having the specified values of reactance and resistance at the beginning and end of the heating cycle) can be made to accept equal power at the beginning and end of the cycle. The formulae are stated in the above form so that the designer may know before determining the value of M, at what power for a given $E_G$ he may achieve the desired unity power ratio. If a greater or less power is required, then the number of turns in the inductor must be varied or a transformer of the required turns ratio used. Simultaneously, the reactance $X_M$ of the reactor M is multiplied by the same factor as $R_L$ and $X_L$. If this factor is $k$, the power is multiplied by $1/k$. Such procedures are conventional and well known in the art.

As will be obvious, where the actual power is unimportant so long as the ratio is unity, the formulae for $X_m$ may be rewritten so as to obtain the value of X directly as follows:

$$X_M = X_{L1} - \sqrt{\frac{R_{L1}(R_{L1} + R_{L2})(\sec a \pm \sqrt{\tan^2 a - \tan^2 b})}{\cos a} - R_{L1}^2}$$

From an examination of Figure 6 it will be seen that as the impedance of the load changes during the heating cycle, the new current vectors $I_{R'}$ will rotate from $I_{P'}$ to $I_{Q'}$, the effect of which is to progressively but slightly increase and then decrease by the same amount the in-phase current vector $I'_{R'}$ during the heating cycle. This variation is slight and for all practical purposes it may be said that the power input to the load is generally constant throughout the heating cycle.

It will be appreciated that the value of the reactance M may be determined experimentally by arbitrarily choosing values of reactance, putting them in the heating circuit and running test cycles on the article to be heated until a value of reactance is found which will accomplish the desired results.

It is, of course, realized that capacitors have been placed in series with the load heretofore, but never with the objects in view or of the reactive value relative to the impedance variation of the load, as described herein.

Figure 7:
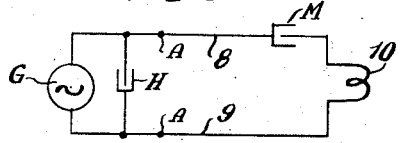
Fig. 7 is a wiring diagram showing a complete circuit embodying the present invention, the value of the reactive elements being as explained herein.

Figure 7 shows a completed induction heating circuit including a power source G and a power factor correcting capacitor H which may or may not be made variable depending on the degree of power factor control required. It will be appreciated that with the reactor M used according to this invention, the power factor will probably vary over rather wider ranges than without the reactor.

It has been found that, using a reactance of a value as determined by one of the above methods, in series with the inductor of induction heating apparatus, the average instantaneous power delivered to the load could be raised to as high as 93% of the maximum power input to the work at any given instance, whereas, without the capacitor, the average input was around 77% of the maximum power input at any one time. This is a substantial improvement, permitting the power source to deliver power always at or near its maximum power rate without fear of overloading it on instantaneous peaks or during any portion of the heating cycle.

Figure 8:
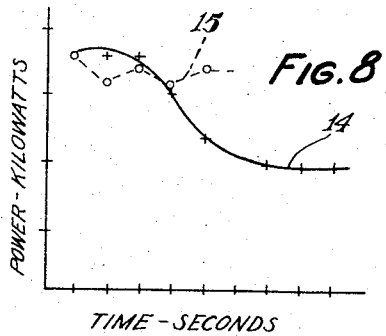
Figure 8 is a graph of the power in kilowatts absorbed by a typical load plotted against the heating time in seconds showing the results obtainable with and without the present invention.

The results just referred to are illustrated graphically in Figure 8 wherein the power in kilowatts absorbed by the same load or workpiece with and without the present invention is plotted against the time in seconds in which the power is applied. Curve 14 shows the power input when the present invention is not employed and is conventional. Without the invention, the power varies from a maximum of 18 kilowatts to a minimum, constant and final value of 10 kilowatts. Curve 15 shows the results obtainable with the present invention. In this instance, the initial power was 18 kilowatts which dropped to 16 kilowatts and then varied between 17 and 16 kilowatts during the remainder of the heating cycle. In this instance, the curve 15 shown is somewhat less in length than the curve 14 because, using the present invention, the load or workpiece reached the melting point twenty seconds earlier than when the invention was not employed.

Thus it will seem that an electrical circuit embodying the present invention together with a method of determining the electrical constants of the elements which make up the circuit have been described which accomplishes the objects of the invention referred to above and others, and that the circuit so conditions the load that the average instantaneous power delivered during the course of a heating cycle may be substantially constant throughout the heating cycle, or the ratio of the power at the beginning and end of the cycle may be made as desired, and a power source having a given amount of an average power to be delivered to the load, may be of a minimum size for the power.

For the purposes of complying with the patent laws, a specific embodiment of the invention has been described. It will be appreciated, however, that various modifications, alterations, or other changes will occur to those skilled in the art upon a reading and understanding of this specification. It is my intention to be protected as to all such modifications and alterations insofar as they come within the scope of the appended claim.

Having thus described my invention, I claim:

An inductive heating circuit, a source of power, an inductor connected to said source of power and inductively coupled to an article to be heated, the input impedance of which inductor changes during a heating cycle, means for compensating for the change in input impedance and causing a generally constant power flow during the heating cycle, said means comprising a capacitor in series with said inductor and having an electrical value determined as follows:

$$X_M = X_{L1} - \sqrt{\frac{R_{L1}(R_{L1}+R_{L2})(\sec a \pm \sqrt{\tan^2 a - \tan^2 b})}{\cos a} - R_{L1}^2}$$

wherein the letters are as defined in the specification.

JAMES W. WILLIAMSON.

REFERENCES CITED

The following references are of record in the file of this patent:

UNITED STATES PATENTS

| Number | Name | Date |
|---|---|---|
| 1,642,198 | Gerth | Sept. 13, 1927 |
| 1,948,704 | Fischer | Feb. 27, 1934 |
| 2,511,026 | Wadhams et al. | June 13, 1950 |